United States Patent [19]

Jou

[11] Patent Number: 5,072,861
[45] Date of Patent: Dec. 17, 1991

[54] LIQUID DISPENSING CONTROLLER

[76] Inventor: Wen-San Jou, P.O. Box 82-144, Taipei, Taiwan

[21] Appl. No.: 637,669

[22] Filed: Jan. 7, 1991

[51] Int. Cl.$^5$ .............................................. B67D 3/00
[52] U.S. Cl. ................................. 222/481; 222/481.5; 222/566
[58] Field of Search ................... 222/481, 481.5, 482, 222/484, 487, 566

[56] References Cited

U.S. PATENT DOCUMENTS

| | | | |
|---|---|---|---|
| 2,141,870 | 12/1938 | Koukal | 222/481 X |
| 2,416,582 | 2/1947 | Harr | 222/481 X |
| 3,422,998 | 1/1969 | Murray | 222/481 X |
| 4,249,676 | 2/1981 | Beery | 222/481 X |
| 4,715,516 | 12/1987 | Salvail | 222/481.5 X |
| 4,722,463 | 2/1988 | Anderson | 222/481.5 X |
| 4,844,290 | 7/1989 | McCurdy et al. | 222/484 X |
| 4,871,096 | 10/1989 | Horian | 222/481 |
| 4,925,068 | 5/1990 | Schneider | 222/481 X |

FOREIGN PATENT DOCUMENTS

| | | | |
|---|---|---|---|
| 0307856 | 5/1933 | Italy | 222/481 |
| 0933962 | 8/1963 | United Kingdom | 222/481 |

Primary Examiner—Joseph E. Valenza
Assistant Examiner—James R. Bidwell
Attorney, Agent, or Firm—Alfred Lei

[57] ABSTRACT

This invention relates to a liquid dispensing controller and in particular to one which mainly includes a controlling unit and a press device whereby the liquid will not flow out of a bottle even if the bottle is overturned and may be controlled in flow rate. Further, the liquid dispensing controller is adapted to various kinds of cups thereby preventing liquid from spilling everywhere.

1 Claim, 6 Drawing Sheets

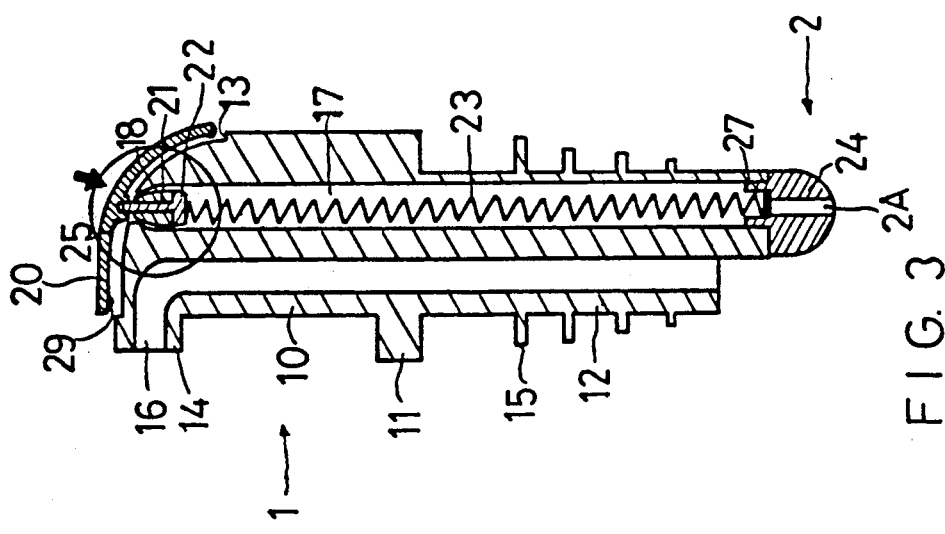
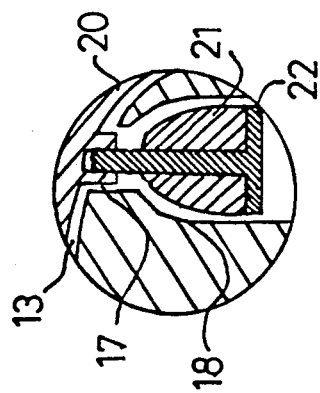
FIG. 3
FIG. 4

(A)
(B)
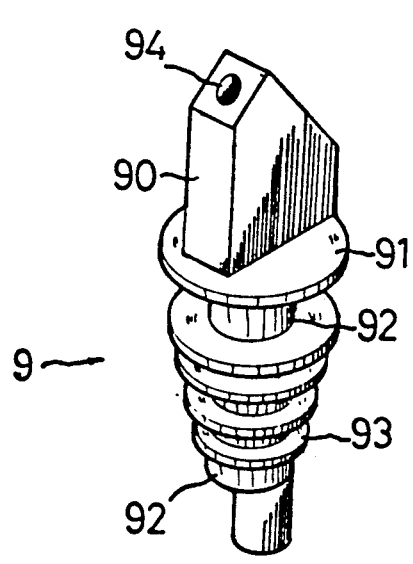
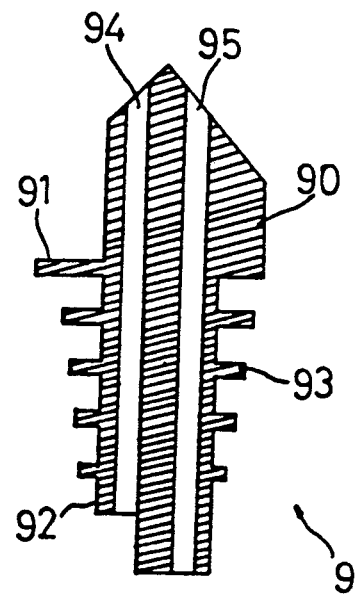
PRIOR ART
FIG. 8
PRIOR ART
FIG. 9

LIQUID DISPENSING CONTROLLER

BACKGROUND OF THE INVENTION

It is found that the prior art liquid dispenser has the following drawbacks:

1. The liquid may flow out of a bottle when the bottle is inadvertently overturned.
2. The flow rate of liquid dispensing from the bottle cannot be controlled.
3. The liquid dispenser is not adapted to the mouth of the cup thus often causing the liquid to spill everywhere.

Therefore, it is an object of the present invention to provide a liquid dispensing controller which may obviate and mitigate the above-mentioned drawbacks.

SUMMARY OF THE INVENTION

This invention relates to a liquid dispensing controller.

It is the primary object of the present invention to provide a liquid dispensing controller which may prevent liquid from flowing out of a bottle even if the bottle is overturned.

It is another object of the present invention to provide a liquid dispensing controller which may control the flow rate of the liquid dispensing from a bottle.

It is still another object of the present invention to provide a liquid dispensing controller which may be adapted to various kinds of cups thereby preventing the liquid spilling from the cup.

It is still another object of the present invention to provide a liquid dispensing controller which is simple in construction.

Other objects and merits and a fuller understanding of the present invention will be obtained by those having ordinary skill in the art when the following detailed description of the preferred embodiment is read in conjunction with the accompanying drawings.

BRIEF DESCRIPTION OF THE DRAWINGS

FIG. 3 is a sectional view of the present invention;
FIG. 4 is an enlarged fragmentary view of FIG. 3;
FIG. 8 is a perspective of the prior art;
and
FIG. 9 is a sectional view of the prior art.

DETAILED DESCRIPTION OF THE PREFERRED EMBODIMENT

Figure 1:
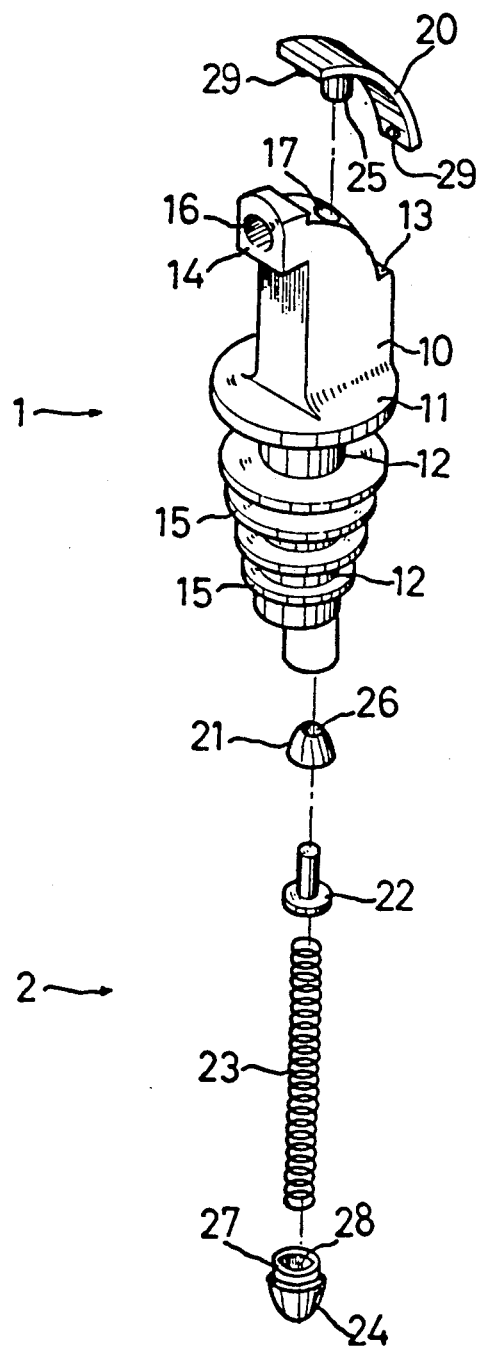
FIG. 1 is an exploded view of the present invention.
Figure 2:
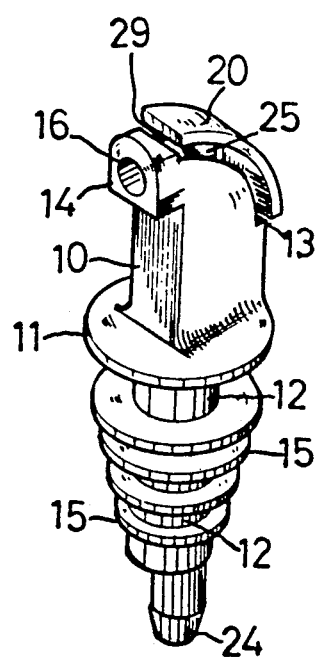
FIG. 2 is a perspective view of the present invention.
Figure 5:
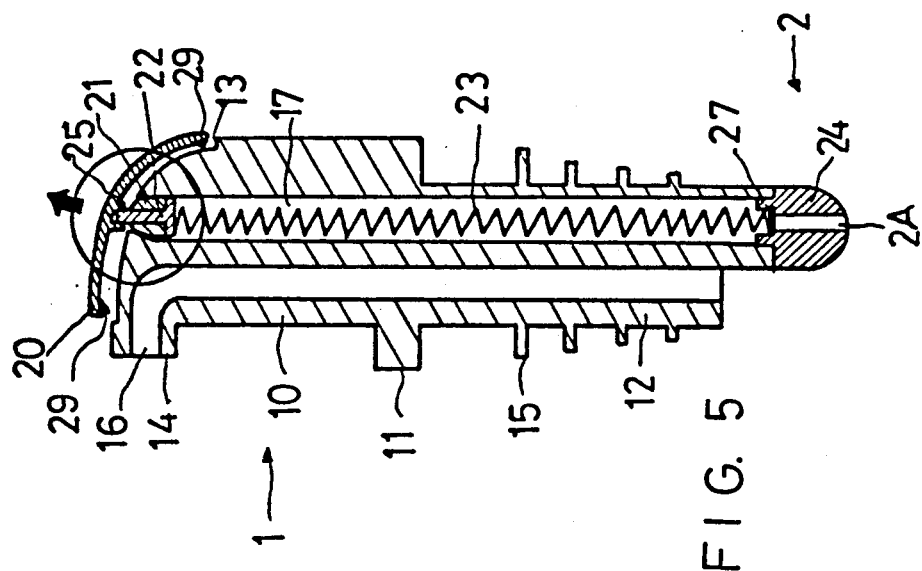
FIG. 5 is another sectional view of the present invention.
Figure 6:
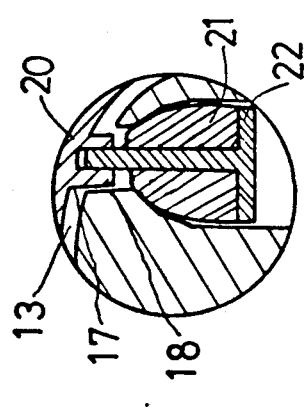
FIG. 6 is an enlarged fragmentary view of FIG. 5.
Figure 7:
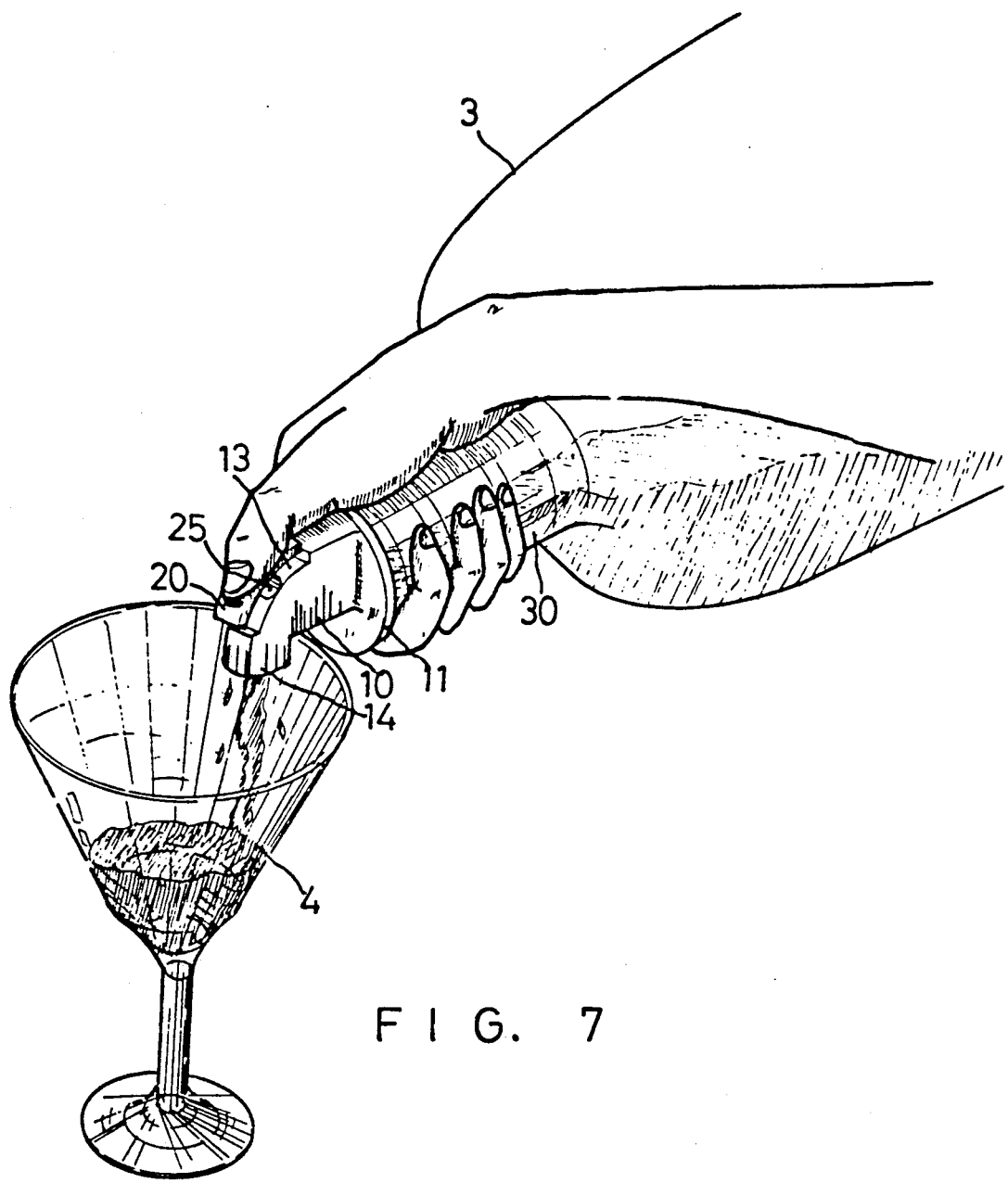
FIG. 7 is a working view of the present invention.

With reference to the drawings and in particular to FIG. 1 thereof, the liquid dispensing controller according to the present invention mainly comprises a controlling unit 1 which is composed of a guide portion 10, a base 11 and a body portion 12. The guide portion 10 is provided at the top with a curved groove 13 and at the front with a hook member 14. The body portion 12 is provided with a plurality of annular flanges 15 in which the upper one is larger than the lower one in diameter. The controlling unit 1 is formed with a liquid hole 16 and an air hole 17. The liquid hole 16 extends through the guide portion 10 and the hook member 14 of the controlling unit 1, while the air hole 17 extends through the curved groove 13 of the controlling unit 1 to form an inclined surface 18.

A press device 2 constituted by a press plate 20, a stop member 21, a T-shaped guide 22, a spring 23 and a cap 24 is fitted in the air hole 17 of the controlling unit 1. The bottom surface of the press device 2 is provided with a tubular member 25 and a protuberance 29 for limiting the down stroke of the press plate 20. The stop member 21 is formed with a hole 26 through which the T-shaped guide 22 may pass to engage with the tubular member 25 of the press plate 20. The cap 24 is provided with a projecting portion 27 at the upper end, a recess 28 for receiving spring, and a center through hole 24.

In assembly, first insert the upper end of the T-shaped guide 22 through the hole 26 of the stop member 21. As the stop member 21 is made of elastic material and its hole 26 is slightly smaller than the upper end of the T-shaped guide 22, the T-shaped guide 22 is tightly connected with the stop member 21. Then, fit the T-shaped guide 22 together with the stop member 21 into the air hole 17 of the controlling unit 1, with the upper end of the of the T-shaped guide 22 engaged with the tubular member 25 of the press plate 20. Thereafter, dispose the spring 23 into the air hole 17, pushing against the lower end of the T-shaped guide 22. Then, the projecting portion 27 of the cap 24 is engaged with the air hole 17 with the lower end of the spring 23 received in the recess 28 of the cap 24.

When in use (see FIGS. 3, 4, 5, 6 and 7), the controlling device 1 is first engaged with a bottle 3. By means of the annular flanges 15, the controlling device 1 is tightly engaged with the mouth 30 of the bottle 3. In the meantime, control the press plate 20 with the thumb and grasp the mouth 30 with the other four fingers such that the bottle 3 is disposed in an inclined position. Then, engage the hook member 14 of the controlling device 1 with the upper edge of a cup 4 and push the press plate 20 with the thumb thereby urging the T-shaped guide 22 to press the spring 23 and pushing the stop member 21 to go downwards. As the stop member 21 goes downwards, air will enter into the air hole 17 of the controlling device 1 so that the liquid in the bottle 3 will flow into the cup 4 through the liquid hole 16 of the controlling device 1. In order to prevent excess applied force which may cause the press plate 20 to seal the air hole 17. The protuberances 29 between which the press plate 20 is located are adapted to the curved groove 13 for limiting the maximum downward stroke of the press plate 20.

Hence, even if the bottle 3 is overturned, the press plate 20 will not be pushed open thereby preventing liquid flowing out everywhere. Further, the flow rate of the liquid out of the bottle may be adjusted. In addition, the present invention may be adapted to the various kinds of cups thus preventing liquid from spilling everywhere.

Although the present invention has been described with a certain degree of particularity, it is understood that the present disclosure is made by way of example only and that numerous changes in the detail of construction and the combination and arrangement of parts may be resorted to without departing from the scope and spirit of the invention as hereinafter claimed.

I claim:

1. A liquid dispensing controller comprising:
   a controlling unit composed of a guide portion, a base and a body portion, said guide portion being provided at the top with a curved groove and at the front with a hook member, said body portion being provided with a plurality of annular flanges in which the upper one is larger than the lower one in diameter, said controlling unit being formed with a liquid hole and an air hole, said liquid hole extending through said guide portion and said hook member while said air hole extending through the curved groove to form an inclined surface; and a press device constituted by a press plate, a stop member, a T-shaped guide, a spring and a cap and fitted in the air hole of said controlling unit, said press device being provided at the bottom with a tubular member and a protuberance for limiting maximum down stroke of the press device, said stop member being formed with a hole through which the T-shaped guide may pass to engage with the tubular member of said press plate, said cap being provided with a projecting portion at the upper end, a recess for receiving spring and a center through hole.

* * * * *